United States Patent
Yanagihara et al.

(10) Patent No.: US 6,184,328 B1
(45) Date of Patent: Feb. 6, 2001

(54) PROPYLENE-BASED POLYMER, METHOD FOR ITS PRODUCTION, COMPOSITION THEREOF, CATALYST COMPONENT FOR POLYMERIZATION, AND METHOD FOR ITS PRODUCTION

(75) Inventors: Hisayoshi Yanagihara; Kazuyuki Watanabe; Satoshi Iwamoto; Hirotoshi Takahashi; Kazuharu Itoh, all of Oita (JP)

(73) Assignee: Showa Denko Kabushiki Kaisha, Tokyo (JP)

( * ) Notice: Under 35 U.S.C. 154(b), the term of this patent shall be extended for 0 days.

(21) Appl. No.: 09/207,412

(22) Filed: Dec. 8, 1998

Related U.S. Application Data

(63) Continuation of application No. 08/256,407, filed on Jul. 7, 1994, now Pat. No. 5,916,990.

(51) Int. Cl.$^7$ .................................................. C08F 110/06
(52) U.S. Cl. ................ 526/351; 526/119; 526/125.3; 526/125.6; 502/104; 502/111; 502/125; 502/126; 502/127
(58) Field of Search .................. 526/351, 119, 526/125.3, 125.6; 502/111, 127, 104, 125, 126

(56) References Cited

U.S. PATENT DOCUMENTS

| | | | |
|---|---|---|---|
| 4,442,276 | 4/1984 | Kashiwa et al. | 526/351 |
| 4,560,734 | 12/1985 | Fujishita et al. | 526/351 |
| 4,914,069 | 4/1990 | Job et al. | 526/125.6 |
| 4,952,649 | 8/1990 | Kioka et al. | 526/125.6 |
| 5,023,223 | 6/1991 | Ebara et al. | 526/119 |
| 5,077,341 * | 12/1991 | Saito et al. | 525/270 |
| 5,239,022 | 8/1993 | Winter et al. | 526/160 |
| 5,244,989 | 9/1993 | Hara et al. | 526/351 |
| 5,349,032 | 9/1994 | Miyake et al. | 526/160 |
| 5,354,820 | 10/1994 | Funabashi | 526/125.6 |
| 5,385,993 | 1/1995 | Fujita | 526/125.3 |

FOREIGN PATENT DOCUMENTS

| | | |
|---|---|---|
| 74350/94 | 4/1995 | (AU) . |
| 0288845 | 11/1988 | (EP) . |
| 0321852 | 6/1989 | (EP) . |
| 0450456 | 10/1991 | (EP) . |
| 0452156 | 10/1991 | (EP) . |
| 0455313 | 11/1991 | (EP) . |
| 0564004 | 10/1993 | (EP) . |
| 0573862 | 12/1993 | (EP) . |
| 0579510 | 1/1994 | (EP) . |

(List continued on next page.)

OTHER PUBLICATIONS

.Database WPI, Section Ch, Week 8251, Derwent Publications Ltd., London, GB; AN 82–09857J XP002010643 & JP–A–57 103 819 (Mitsubishi Petroch KK) Jun. 28, 1982 *abstract*.

*Primary Examiner*—David W. Wu
*Assistant Examiner*—Ling-Siu Choi
(74) *Attorney, Agent, or Firm*—Sughrue, Mion, Zinn, Macpeak & Seas, PLLC

(57) ABSTRACT

There are provided a propylene-based polymer characterized in that (1) the xylene-extraction insoluble portion (XI) is 99.0 wt % or greater, (2) the isotactic pentad ratio (IP) is 98.0% or greater as measured by $^{13}$C nuclear magnetic resonance spectroscopy, (3) the isotactic average chain length (N) is 500 or greater, and (4) the total amount of each of the fractions obtained by column separation of the xylene insolubles whose average chain length ($N_f$) is 800 or greater accounts for 10 wt % or more of the entirety, and a method for its production, as well as a propylene-based polymer composition prepared by combining with this propylene-based polymer at least a nucleating agent in the range of 0.05–15 wt %. In addition, there are provided a polymerization catalyst component allowing the production of such a propylene-based polymer, and a method for its production.

4 Claims, 1 Drawing Sheet

FOREIGN PATENT DOCUMENTS

| | | |
|---|---|---|
| 59-221310 | 12/1984 | (JP) . |
| 62-104813 | 5/1987 | (JP) . |
| 3195751 | 8/1991 | (JP) . |
| 432085 | 5/1992 | (JP) . |
| 190510 | 9/1992 | (JP) . |
| 59226 | 1/1993 | (JP) . |
| 199169 | 2/1993 | (JP) . |

* cited by examiner

PROPYLENE-BASED POLYMER, METHOD FOR ITS PRODUCTION, COMPOSITION THEREOF, CATALYST COMPONENT FOR POLYMERIZATION, AND METHOD FOR ITS PRODUCTION

This is a continuation of application Ser. No. 08/256,407 filed Jul. 7, 1994, now U.S. Pat. No. 5,916,990 the disclosure of which is incorporated herein by reference.

FIELD OF THE INVENTION

The present invention relates to a propylene-based polymer with excellent physical properties such as rigidity, surface hardness, heat resistance, water vapor barrier property, etc. which is suitable for use in automobiles, consumer electric goods and packaging materials, to a method for the production thereof, to a composition containing it and to a catalyst component for its polymerization and a method for its production.

BACKGROUND ART

Propylene-based polymers are generally inexpensive, and exhibit characteristic properties including transparency, mechanical strength, heat resistance, surface gloss, chemical resistance, oil resistance, rigidity, flex clacking resistance, etc., for which they thus have a wide range of uses as industrial materials, food packaging materials, cosmetic packaging materials, drug packaging materials, and the like.

As mentioned above, propylene-based polymers exhibit characteristics such as rigidity, impact resistance, etc., and are thus widely used in various production industries including automobiles, consumer electric goods, miscellaneous goods, and the like. Recently, producers are investigating the prospect of making products thinner in order to render them more light-weight and lower their cost, while increasing the surface strength in order to prevent damage to the surface thereof. That is, demand is increasing for propylene-based polymers which have high rigidity, high surface hardness and excellent impact resistance. Also, demand has continued to increase for a higher level of physical properties and workability, and particularly desired are the maintaining of the rigidity and strength at high temperatures, durability, and the improvement of the moldability of large-size moldings.

Regarding high rigidity and improved transparency and surface gloss of propylene-based polymers, there have been conventionally known methods which employ fillers such as $I_a$ and $II_a$ group metal salts of monocarboxylic acids (for example, sodium benzoate), III–IV group metal salts of dicarboxylic acids (for example, adipic acid) and aliphatic dicarboxylic acids (for example, aluminum adipate), dibenzylidene sorbitol derivatives, talc and the like, as nucleating agents (Japanese Examined Patent Publication (KOKOKU) No. 39-1809, Japanese Unexamined Patent Publication (KOKAI) No. 60-139731, etc.), and methods which create a wide distribution of the molecular weight of propylene-based polymers (Japanese Unexamined Patent Publication (KOKAI) Nos. 56-2307, 59-172507, and 62-195007, etc.).

However, although use of these nucleating agents results in improvement in the aforementioned physical properties, it cannot be said that they are necessarily sufficient for all uses.

Consequently, it has been desired to obtain propylene-based polymers suitable as materials for automobiles, consumer electric goods and packaging materials, which have excellent mechanical strength including impact resistance, rigidity, etc. as well as surface hardness and heat resistance, at the same time lowering the density of the products to render them more thin by reducing the amount of fillers such as talc and the like.

Furthermore, efforts are continuing to improve the stereoregularity (isotacticity) of propylene-based polymers, widen their molecular weight distribution, increase their strength and durability which depend on the molecular weight distribution, and improve the moldability in extrusion molding, blow molding and the like.

Of these efforts, the development particularly of catalysts with high activity and producing high isotacticity are recently being ardently studied. All are catalyst systems comprising a solid catalyst component containing magnesium, titanium, a halogen and an electron-donating compound as essential components, with an organoaluminum and another electron-donating compound, and examples thereof are disclosed in Japanese Unexamined Patent Publication (KOKAI) Nos. 57-63310, 58-32604, 58-83006, 59-206408, 59-219311, 60-130607, 61-209207, 61-211309, 62-72702, 62-104811, 62-11705, 63-199703, 63-264609, 1-126306, 1-311106, 3-62805, 3-70710, 4-103604, 4-114009 and 4-202505.

The present inventors have also made recent disclosures in this regard in Japanese Unexamined Patent Publication (KOKAI) Nos. 4-43407, 4-149217, 4-178406, 4-180903, 4-185613, 4-198202, 4-198204, 5-9209 and 5-287019.

The propylene-based polymers disclosed in the preceding publications have a xylene-extraction insoluble portion of less than 99% and an isotactic pentad ratio (mmmm) of methyl groups in the polypropylene of at most around 93–98%, as measured by $^{13}C$ nuclear magnetic resonance spectroscopy (hereunder abbreviated to $^{13}C$-NMR), and thus there have been limits to the improvement in the various physical properties such as rigidity and heat resistance.

DISCLOSURE OF THE INVENTION

The object of the present invention is to provide a propylene-based polymer which has excellent rigidity, surface hardness, heat resistance, transparency, surface gloss, water vapor barrier property, etc., without any loss of the original physical properties of propylene-based polymers, which is suitable for use in automobiles, consumer electric goods and packaging materials, and a method for its production, as well as a composition containing it, a catalyst component for its polymerization and a method for the production thereof.

We the present inventors, as a result of a multitude of research regarding methods of overcoming the above mentioned problems, have discovered that the above mentioned problems are overcome with a propylene-based polymer in which (1) the xylene-extraction insoluble portion (XI) is 99.0 wt % or greater, (2) the isotactic pentad ratio (IP) is 98.0% or greater as measured by $^{13}C$ nuclear magnetic resonance spectroscopy, (3) the isotactic average chain length (N) is 500 or greater, and (4) the total amount of each of the fractions obtained by column separation of the xylene insolubles whose average chain length ($N_f$) is 800 or greater accounts for 10 wt % or more of the entirety, and thus the present invention has been completed.

BEST MODE FOR CARRYING OUT THE INVENTION

A concrete explanation of the characteristics of the propylene-based polymer according to the present invention will now be given.

(1) The xylene-extraction insoluble portion (XI) is the percent by weight of the polymer which is insoluble in xylene at 25° C. Specifically, it is the percent by weight of the polymer which is first dissolved in ortho-xylene at 135° C. and then precipitated at 25° C. The XI of the propylene-based polymer of the present invention is 99.0% or greater, preferably 99.5% or greater, and more preferably 99.7% or greater. If the XI is less than 99.0% then the polymer will lack the desired rigidity, heat resistance, surface hardness, surface gloss, transparency, water vapor barrier property, etc.

(2) The isotactic pentad ratio of the polypropylene molecular chain (hereunder sometimes abbreviated to IP) as measured by $^{13}C$ nuclear magnetic resonance spectroscopy is determined according to the method of A. Zambelli, Macromolecules, 6, 925, 1973. That is, it refers to the isotacticity of the propylene-based polymer molecular chain in pentad units, as measured using nuclear magnetic resonance spectroscopy with isotopic carbon ($^{13}C$-NMR). The IP according to the present invention is the measured value for the actual polypropylene obtained by polymerization, and is not the measured value for the polypropylene after the above mentioned xylene extraction or other extraction, separation, etc.

The classification of peaks was carried out based on the revised edition of the above document, as described in Macromolecules, 8, 687, 1975, and the IP was measured by the proportion of the strength of the mmmm peaks out of the total absorption peaks of the methyl carbons by $^{13}C$-NMR spectroscopy.

The thus-measured IP of the propylene-based polymer must be 98.0% or greater, because if it is lower than this value the polymer will lack the desired rigidity, heat resistance, surface hardness, surface gloss, transparency, water vapor barrier property, etc. The IP of the propylene-based polymer is preferably 98.5% or greater. A propylene-based polymer with an IP of 99.0% or greater is particularly preferred.

(3) The isotactic average chain length (N) is the isotactic average chain length of methyl groups in the polypropylene molecule, and it may be calculated based on the method reported by J. C. Randall (Polymer Sequence Distribution, Academic Press, New York, 1977, chapter 2).

Specifically, the polypropylene is heated at a temperature of 130° C. to dissolution in a mixed solvent of 1,2,4-trichlorobenzene/denterated benzene to make a polymer concentration of 10 wt %.

This solution is placed in a glass sample tube having an inside diameter of 10 mmφ, and measured by $^{13}C$-NMR under the same measuring conditions as for the isotactic pentad ratio (IP) previously.

We assume the definition of the 2-site model described in "Shan-Nong Zhu, Xiao-Zhen Yang, Riichiro Chujo: Polymer Journal, Vol.15, No.12, p.859–868, 1983", i.e. that two active species are involved during polymerization. One of the species is called catalyst-controlled polymerization and the other is chain end-controlled polymerization. (The details regarding catalyst-controlled polymerization and chain end-controlled polymerization are described by Junji Furukawa in Macromolecules: Essence and Topics 2, "Macromolecular Synthesis", p.73, published by Kagaku Dojin, KK., 1986).

The 2-site model may be categorized as follows:

α: Catalyst-controlled polymerization (enantiomorphic process): probability of a D-body and an L-body adding to the polymerization ends, that is, an indication of the degree of disorder in an isotactic component.

σ: Chain end-controlled polymerization (Bernoulli process): Probability of forming a meso body by addition of the same species as on the polymerization end.

ω: Proportion of a sites.

Homopolypropylene splits into 10 peaks of pentad units due to the isotacticity of the methyl groups, but in order for the actual measured value to agree with the calculated strength (area), α, σ and ω are calculated by the least square method, and based thereon the amounts $A_1$–$A_{10}$ of each of the pentad units are determined by the following equations.

| | |
|---|---|
| Meso body | $A_1 = mmmm = \omega(1 - 5\beta + 5\beta^2) + (1 - \omega)\sigma^4$ |
| | $A_2 = mmmr = \omega(2\beta - 6\beta^2) + 2(1 - \omega)\sigma^3(1 - \sigma)$ |
| | $A_3 = rmmr = \omega\beta^2 + (1 - \omega)\sigma^2(1 - \sigma)^2$ |
| Racemic structure | $A_4 = mmrr = \omega(2\beta - 6\beta^2) + 2(1 - \omega)\sigma^2(1 - \sigma)^2$ |
| | $A_5 = mmrm = 2\omega\beta^2 + 2(1 - \omega)\sigma^3(1 - \sigma)$ |
| | $A_6 = rmrr = 2\omega\beta^2 + 2(1 - \omega)\sigma(1 - \sigma)^3$ |
| | $A_7 = rmrm = 2\omega\beta^2 + 2(1 - \omega)\sigma^2(1 - \sigma)^2$ |
| | $A_8 = rrrr = \omega\beta^2 + 2(1 - \omega)(1 - \sigma)^4$ |
| | $A_9 = mrrr = 2\omega\beta^2 + 2(1 - \omega)\sigma(1 - \sigma)^3$ |
| | $A_{10} = mrrm = \omega(\beta - 3\beta^2) + (1 - \omega)\sigma^2(1 - \sigma)^2$ |

* $\beta = \alpha(1 - \alpha)$

Next, when the definitional equation for the average chain length (N)

N=number of meso chains/number of meso units described in the aforementioned document by J. C. Randall is applied to each of the pentad units $A_1$–$A_7$ calculated above, it may be calculated by $$N = \frac{A_1 + A_2 + A_3 + 0.5(A_4 + A_5 + A_6 + A_7)}{0.5(A_4 + A_5 + A_6 + A_7)}$$

The N value according to the present invention is the measured value for the actual polypropylene obtained by polymerization, and it is not the measured value of the polypropylene after the above mentioned xylene extraction or other extraction, separation, etc. N for the isotactic propylene-based polymer of the present invention is 500 or greater, preferably 700 or greater, and more preferably 800 or greater. If N is less than 500 then the polymer will lack the desired rigidity, heat resistance, etc.

In general, the $^{13}C$-NMR signal of polypropylene gives three major peaks for methylene, methine and methyl.

When the peak of the methyl regions is magnified, the data shown in FIG. 1 is obtained, showing an asymmetrical bond form of • • • mmmmrmmmm • • •, • • • mmmmmmr-rmmmmm • • •, etc.

The crystallizable isotactic average chain length may be considered as having a inverse relationship with the asymmetrical bonds.

A larger number of asymmetrical bonds, i.e. more racemic structures in between the mmmm structures, will shorten the average chain length (N).

As mentioned above, the average chain length (N) calculated in this manner gives the length of the sequence of the crystallizable isotactic structures, and thus it may be understood that as this length becomes greater (fewer asymmetrical bonds), the physical properties of the propylene-based polymer, such as rigidity, heat resistance, water vapor barrier property, etc. will improve.

(4) The average chain length of the fractions ($N_f$) obtained by column separation of the xylene insolubles is found by first dissolving the xylene-extraction insoluble portion of the polypropylene obtained in (1) above in paraxylene at a temperature of 130° C., adding celite thereto, lowering the temperature to 30° C. at a temperature-lowering rate of 10° C./hour to deposit the celite, filling a column therewith, raising the temperature from 70° C. to 130° C. by 2.5° C. at a time, separating off the fractions, and then calculating the average chain length (N) of each of the separated fractions by the aforementioned method as the average chain length for each fraction ($N_f$).

In the propylene-based polymer according to the present invention, the total amount of each of the fractions obtained by column separation of the xylene insolubles whose average chain length ($N_f$) is 800 or greater accounts for 10 wt % or more of the entirety. It preferably accounts for 30 wt % or more, and more preferably 50 wt % or more.

If the total amount of fractions with an average chain length ($N_f$) of 800 or greater accounts for less than 10 wt % of the entirety, then there will be less of the desired improving effect on the rigidity, surface hardness, heat resistance and water vapor barrier property.

An explanation will now be given in regard to the method of production of a propylene-based polymer according to the present invention.

The propylene-based polymer according to the present invention may be produced by the polymerization of propylene using a polymerization catalyst which contains (A) a solid catalyst component for polymerization having as essential components a magnesium compound, titanium compound, halogenous compound and a first electron-donating compound, wherein the molar ratio of the first electron-donating compound and the titanium atom content (D/T) incorporated into the solid catalyst component for polymerization is such that D/T≧1; (B) an organoaluminum compound; and (C) a second electron-donating compound.

Here, the magnesium compound may be exemplified by magnesium halides such as magnesium dichloride, magnesium dibromide and magnesium diiodide; alkoxy magnesiums such as dimethoxy magnesium, diethoxy magnesium, dipropoxy magnesium, dibutoxy magnesium and diphenoxy magnesium; carboxylates such as magnesium laurate, magnesium stearate and magnesium acetate; and alkyl magnesiums such as diethyl magnesium and butylethyl magnesium. These various magnesium compounds may be used either alone or with 2 or more thereof in combination. Preferably, a magnesium halide or alkoxy magnesium is used, or a magnesium halide is formed during formation of the catalyst. The above mentioned halogen is most preferably chlorine.

The titanium compound may be exemplified by titanium halides such as titanium tetrachloride, titanium trichloride, titanium tetrabromide and titanium tetraiodide; alkoxy titanium compounds such as tetramethoxy titanium, tetraethoxy titanium, tetrapropoxy titanium, tetrabutoxy titanium and tetraphenoxy titanium; and alkoxy titanium halides such as ethoxy titanium chloride, butoxy titanium chloride, phenoxy titanium chloride, dibutoxy titanium chloride and tributoxy titanium chloride, etc. These various titanium compounds may be used either alone or with 2 or more thereof in combination. Preferably, a halogenous tetravalent titanium compound is used, and more preferably titanium tetrachloride.

The halogen in the halogenous compound is fluorine, chlorine, bromine or iodine, preferably chlorine, and specific compounds as actual examples will depend on the method of preparing the catalyst component; however, titanium halides such as titanium tetrachloride, titanium tetrabromide, etc.; silicon halides such as silicon tetrachloride, silicon tetrabromide; and phosphorous halides such as phosphorous trichloride and phosphorous pentachloride may be given as examples, and depending on the method of preparing the catalyst component a halogenated hydrocarbon, halogen molecule or hydrohalogenic acid may also be used.

As the first electron-donating compound there may be mentioned in general oxygen-containing compounds, nitrogen-containing compounds, phosphide-containing compounds, sulfur-containing compounds, etc. Oxygen-containing compounds include, for example, alcohols, ethers, esters, acid halides, acid anhydrides, etc.

More specifically, there may be mentioned alcohols such as methyl alcohol, ethyl alcohol, propyl alcohol, butyl alcohol, pentyl alcohol, hexyl alcohol, heptyl alcohol, octyl alcohol, nonyl alcohol, decyl alcohol, 2-ethyl alcohol, oleyl alcohol, benzyl alcohol, phenylethyl alcohol, phenol, cresol, ethyl phenol and naphthol;

ethers and diethers such as methyl ether, ethyl ether, propyl ether, butyl ether, amyl ether, hexyl ether, tetrahydrofuran, anisole and diphenyl ether;

esters such as ethyl acetate, ethyl chloracetate, ethyl propionate, ethyl butyrate, ethyl acrylate, ethyl crotonate, ethyl oleate, ethyl stearate, ethyl phenylacetate, methyl benzoate, ethyl benzoate, propyl benzoate, butyl benzoate, methyl toluate, ethyl toluate, propyl toluate, butyl toluate, methyl ethylbenzoate, methyl anisate, ethyl anisate, methyl ethoxybenzoate, ethyl ethoxybenzoate, ethyl cinnamate, dimethyl phthalate, diethyl phthalate, dipropyl phthalate, di-n-butyl phthalate, diisobutyl phthalate, dihexyl phthalate, dioctyl phthalate, γ-butyrolactone, valerolactone and ethylene carbonate;

acid chlorides such as acetyl chloride, benzoyl chloride, toluic acid chloride and phthalic acid chloride; and acid anhydrides such as maleic anhydride, phthalic anhydride, etc.

These first electron-donating compounds may be used either alone or with 2 or more thereof in combination. Preferably an ester, and more preferably a phthalic acid ester, is used.

Obviously, a single compound may contain 2 or more of the four compounds including the magnesium compound, titanium mncompound, halogen compound and first electron-donating compound.

The amounts of the above mentioned components to be used may be as desired so long as the effect of the present invention is provided, but generally the following ranges are preferred.

The amount of the titanium compound to be used may be at a molar ratio in the range of 0.0001–1000, and preferably in the range of 0.01–100, with respect to the amount of the magnesium compound used. A halogen compound is used as necessary, in which case it is used at a molar ratio in the range of 0.01–1000, and preferably in the range of 0.1–100, with respect to the amount of magnesium used, regardless of whether or not a halogen is contained in the titanium compound or magnesium compound. The amount of the first electron-donating compound to be used is at a molar ratio in the range of 0.001–10, and preferably in the range of 0.01–5, with respect to the amount of the above mentioned magnesium compound used.

The method of preparing the solid catalyst component to be used according to the present invention may be any method of preparing conventional solid catalyst components which are obtained by contacting and reacting at once or in stages a magnesium compound, a titanium compound and a first electron-donating compound, and also if necessary a halogenous compound as an auxiliary.

As specific examples of known preparation methods there may be mentioned the following.

(1) A method in which a magnesium halide, and if necessary a first electron-donating compound and a titanium compound are contacted together.

(2) A method in which a solid component obtained by contacting a magnesium halide, tetraalkoxy titanium and a specific polymeric silicon compound, is contacted with a halogenated titanium compound and/or a halogenated silicon compound.

(3) A method in which a solid component obtained by dissolution of a magnesium compound with tetraalkoxy titanium and a first electron-donating compound, followed by precipitation with a halide agent or halogenated titanium compound, is contacted with a titanium compound.

(4) A method in which alumina or magnesia is treated with a halogenated phosphorous compound and the product is contacted with a magnesium halide, a first electron-donating compound and a halogenated titanium compound.

(5) A method in which an organomagnesium compound, represented by Grignard reagents, is subjected to the action of a reducing agent or halogenating agent, and then contacted with a first electron-donating compound and a titanium compound.

(6) A method in which an alkoxy magnesium compound is contacted with a halogenating agent and/or a titanium compound in the presence or absence of a first electron-donating compound.

(7) A method in which a magnesium compound is dissolved with tetraalkoxy titanium and treated with a polymeric silicon compound, and then treated with a halogenated silicon compound and an organometallic compound.

(8) A method in which a globular magnesium compound/alcohol chelate is treated with a first electron-donating compound and a halogenated titanium compound, etc.

Any of the above mentioned methods of preparing a solid catalyst component may be employed for the production of a propylene-based polymer according to the present invention, but it must be a solid catalyst component for polymerization wherein the molar ratio of the first electron-donating compound and the titanium atom content (D/T) incorporated in the solid catalyst component is at least such that $D/T \geq 1$. Here, it is more preferable if $D/T \geq 1.5$.

If $D/T<1$ it will be difficult to obtain the highly isotactic propylene-based polymer of the present invention.

Thus, according to the present invention there is provided a solid catalyst component for α-olefin polymerization whose essential components are a magnesium compound, a titanium compound, a halogen compound and a first electron-donating compound, wherein the molar ratio (D/T) of the first electron-donating compound (D) and titanium (T) contained in the solid catalyst component is such that $D/T \geq 1$. This solid catalyst component was developed for the above mentioned production of polypropylene with a high degree of isotacticity, but it is also useful as a solid catalyst component for common polymerization of propylene-based polymers in general or of α-olefins other than propylene-based polymers. Particularly, in order to obtain propylene-based polymers with a high degree of isotacticity and the demanded rigidity and heat resistance, D/T is preferably 1.5 or greater.

Also, in the case of solid catalyst components which do not meet the above condition ($D/T \geq 1$) when prepared by conventional methods, they may be made to meet the above conditions by further treatment as indicated below.

In such cases, the molar ratio of the first electron-donating compound and titanium atom content in the solid catalyst component prior to the further treatment for modification $(D/T)_i$ and the molar ratio of the first electron-donating compound and titanium atom content in the modified catalyst component $(D/T)_m$ must have a relationship such that $(D/T)_m/(D/T)_i>1$, and it is more preferable if $(D/T)_m/(D/T)_i \geq 2$.

For example, a solid catalyst component prepared by any of the above mentioned known methods, whose essential components are magnesium, titanium, a halogen and a first electron-donating compound may be further treated with a first electron-donating compound and/or a halogenous compound to increase D/T above its value prior to the treatment, and thus modify the catalyst. The order and frequency of treatment with the first electron-donating compound and halogenous compound are not particularly restricted, but in generally used methods of treating a solid catalyst component, it is first treated with a first electron-donating compound for incorporation and then treated and cleaned with a halogenous compound, and then further washed with a hydrocarbon.

The first electron-donating compound to be used for modification of the catalyst component may be the same as or different from the one used during the preparation of the solid catalyst component prior to the further treatment. The first electron-donating compound may be a single species or 2 or more used in combination. Preferred for use are esters, and particularly phthalic acid esters.

The amount of the first electron-donating compound to be used is in the range of 0.001–500 moles, and preferably in the range of 0.01–50 moles, with respect to the titanium atoms in the solid catalyst component.

If the amount of the first electron-donating compound is extremely low, then it will be difficult to achieve the relationship $(D/T)_m/(D/T)_i>1$, while if it is extremely high the polymerization activity will be lowered, and thus neither condition is desirable.

The halogenous compound to be used for modification of the catalyst may be the same as or different from the one used during the preparation of the solid catalyst component prior to the further treatment. Of these, titanium halides, silicon halides and halogenated hydrocarbons are preferred. The halogenous compound may be a single species or 2 or more used in combination.

The amount of the halogenous compound to be used is in the range of a molar ratio of 0.1–10,000, preferably in the range of a molar ratio of 1–3000, and more preferably in the range of a molar ratio of 5–500, with respect to the titanium atoms in the solid catalyst component. If the amount of the halogenous compound is extremely low, then it will be difficult to achieve the relationship $(D/T)_m/(D/T)_i>1$, while if it is extremely high the polymerization activity will be lowered and the amount of waste solution will increase, and thus neither condition is desirable.

The treatment of the solid catalyst component with the first electron-donating compound for its modification is carried out at a temperature in the range of −30 to 150° C., and preferably 0 to 100° C. Also, the treatment of the solid catalyst component with the halogenous compound is carried out at a temperature in the range of 0 to 200° C., and preferably 50 to 150° C. Temperatures outside of this range are not preferred since the polymerization activity will be lowered as a result.

The treatment for modification of the solid catalyst component using the first electron-donating compound and the halogenous compound may normally be effected in a hydrocarbon solvent. The hydrocarbon to be used here is preferably an inert hydrocarbon, for example, an aliphatic hydrocarbon such as pentane, hexane, heptane, octane, decane, etc. or an aromatic hydrocarbon such as benzene, toluene, xylene, etc. Any of these hydrocarbons may also be used as a solvent for washing the solid catalyst component after its treatment with the first electron-donating compound and the halogenous compound.

The washing of the modified catalyst for olefin polymerization using the above mentioned hydrocarbon, after the unmodified solid catalyst component is treated with the first electron-donating compound and washed with the halogenous compound, is carried out at a temperature in the range of 0–100° C., and preferably 60–140° C. Here, if the washing temperature is extremely low then it will be difficult to achieve the relationship $(D/T)_m/(D/T)_i>1$, while if it is extremely high the relationship $(D/T)_m/(D/T)_i>1$ will be achieved but the polymerization activity will be lowered, and thus neither condition is preferred.

If the solid catalyst component is not treated (washed) with a halogenous compound after its treatment with a first electron-donating compound, then the polymerization activity will be greatly lowered and the effect of the present invention will not be exhibited. The frequency of treatment (washing) with the halogenous compound is not particularly restricted, but for the effect of the present invention to be adequately exhibited it should be carried out 2 to 4 times. One washing will not adequately exhibit the effect of the present invention, while too much washing will lower the polymerization activity, and thus neither is desirable.

Also, according to the present invention, the first electron-donating compound may be a titanium compound represented by the general formula $TiX_a \cdot Y_b$ (where X is a halogen atom such as Cl, Br or I; a is 3 or 4; Y is an electron-donating compound (1); and $0 \leq b \leq 3$), and after the treatment of the catalyst component for the incorporation, washing is effected with a halogenous compound and again with a hydrocarbon, so that the solid catalyst component is improved to where $D/T \geq 1$. Thus, when treatment of a solid catalyst component is effected using a first electron-donating compound, the frequency of treatment (washing) with a halogenous compound according to the present invention must generally be at least twice, as mentioned previously; however, if $TiX_a \cdot Y_b$ is used, the effect of the present invention will be adequately exhibited with a frequency of treatment (washing) with the halogenous compound of 1–2 times. Furthermore, as mentioned later, since the amount of the halogenous compound to be used may be reduced, it is possible to largely reduce the amount of waste solution discharged during washing of the modified solid catalyst component with the hydrocarbon.

$TiX_a$ (where X is a halogen atom such as Cl, Br or I and a is 3 or 4) is generally known to readily form chelates with electron-donating compounds, as described in, for example, R. S. P. Coutts, P. C. Wailes, Advan. Organometal. Chem., 9, 135, 1970; Shinjikken Kagaku Koza, 4th edition, 17, Inorganic Complexes/Chelated Complexes, Nihon Kagakukai Maruzen, 1991, p.35; H. K. Kakkoen, J. Pursiainen, T. A. Pkkanen, M. Ahlgren, E. Iiskola, J. Organomet. Chem., 453, 175, 1993; etc.

The X of $TiX_a \cdot Y_b$ is a halogen atom such as Cl, Br or I, and of these Cl is preferred. The letter "a" is 3 or 4, and preferably 4. Y (the first electron-donating compound) may be selected from the ones mentioned earlier, and it may be the same as or different from the one used during the preparation of the unmodified solid catalyst component. When preparing $TiX_a \cdot Y_b$, the first electron-donating compound used may be a single species or 2 or more in combination. Y is preferably an ester, and more preferably a phthalic acid ester. The molar ratio for the addition of Y to $TiX_a$ during the preparation of $TiX_a \cdot Y_b$ is such that when the above mentioned "a" is 3 then "b" of Y is $0<b \leq 3$, and when "a" is 4, $0<b \leq 2$, and thus the number of electron-donating groups of Y depends on the atomic valence of Ti. Most preferably, a is 4 and b is 1.

The amount of $TiX_a \cdot Y_b$ to be used is at a molar ratio in the range of 0.001–500, preferably a molar ratio in the range of 0.01–50, and more preferably a molar ratio in the range of 0.1–10, with respect to the titanium atoms in the solid catalyst component prior to its modification. If the amount of the $TiX_a \cdot Y_b$ used is extremely small, then it will be difficult to achieve the relationship $(D/T)_m/(D/T)_i>1$, while if it is extremely large the polymerization activity will be lowered, and thus neither condition is preferred.

The amount of the halogenous compound to be used may be at a molar ratio in the range of 0.1 to 1000, preferably a molar ratio in the range of 1 to 500, more preferably at a molar ratio in the range of 5 to 100, with respect to the titanium atoms in the solid catalyst component.

Also, the selection of the halogenous compound may be made in the same manner as described above.

Furthermore, the temperature for treatment of the solid catalyst component with $TiX_a \cdot Y_b$ may be the same as the above temperature for treatment with the first electron-donating compound, and the temperature for washing of the solid catalyst component with the halogenous compound may be the same as mentioned above.

The treatment of the solid catalyst component with $TiX_a \cdot Y_b$ and the washing with the halogenous compound is the same as the treatment with the first electron-donating compound and washing with the halogenous compound described above.

There are no particular restrictions on the frequency of treatment using $TiX_a \cdot Y_b$ and of washing with the halogenous compound, but as mentioned above the effect of the present invention will be adequately exhibited with a single or twice washing by a halogenous compound after treatment with $TiX_a \cdot Y_b$. If washing is not effected with a halogenous compound, then the outstanding properties according to the present invention will not be obtained.

Prepolymerization

The modified solid catalyst component prepared in the manner described above is used for the polymerization of propylene by its combination with an organoaluminum compound and a second electron-donating compound, described below; however, a small amount of the monomer may be prepolymerized prior to the polymerization. This is usually about 0.01–1000 g per gram of the modified solid catalyst component prepared in advance, and the temperature of prepolymerization may be as desired between −30 and 80° C. The prepolymerization is usually carried out in the presence of an organoaluminum compound and a second electron-donating compound to be used in the polymerization described hereunder. The prepolymerization may be generally carried out in an inert hydrocarbon solvent, but it may also be carried out in a liquid monomer, gaseous monomer, etc.

The monomer to be used for prepolymerization may be propylene or, for example, an α-olefin such as ethylene, 1-butene, 3-methyl-1-butene, 3-methyl-1-pentene, 4-methyl-1-pentene, 4,4-dimethyl-1-pentene, vinyl cyclopentane, vinyl cyclohexane, etc.; styrene or a styrene derivative such as α-methylstyrene, etc.; a diene such as butadiene, 1,9-decadiene, etc.; or an allyltrialkylsilane. These monomers need not be used alone, as two or more thereof may be used in stages or in admixture. Hydrogen may be used as the molecular weight modifier for the prepolymerization.

Propylene polymerization

The modified solid catalyst component mentioned above may be used to polymerize a propylene-based polymer in the presence of an organoaluminum compound and a second electron-donating compound.

The organoaluminum compound to be used according to the present invention may be exemplified by trialkylaluminum compounds such as trimethylaluminum, triethylaluminum, tripropylaluminum, tributylaluminum, trihexylaluminum and trioctylaluminum; alkylaluminum hydrides such as dimethylaluminum hydride, diethylaluminum hydride and dibutylaluminum hydride; alkylaluminum halides such as dimethylaluminum chloride, diethylaluminum chloride, diethylaluminum bromide and ethylaluminum sesquichloride; alkylaluminum alkoxides such as diethylaluminum ethoxide and diethylaluminum phenoxide; and aluminoxanes such as methyl aluminoxane, ethyl aluminoxane and propyl aluminoxane. These organoaluminum compounds may be used alone or with 2 or more thereof in combination. Preferably, a trialkylaluminum compound is used.

The second electron-donating compound to be used according to the present invention may be the same as or different from the first electron-donating compound, but as representative examples thereof there may be mentioned aromatic carboxylic acid esters, silicon compounds having an Si—O—C or Si—N—C bond, acetal compounds, germanium compounds having a Ge—O—C bond, and nitrogenous or oxygenous heterocyclic compounds having an alkyl-substituted group.

Specific examples of these compounds include aromatic carboxylic acid esters such as ethyl benzoate, ethyl p-toluate and ethyl p-anisate; silicon compounds such as phenyl trimethoxysilane, diphenyl methoxysilane, di-n-propyl dimethoxysilane, di-i-propyl dimethoxysilane, di-t-butyl dimethoxysilane, dicyclohexyl dimethoxysilane, dicyclopentyl dimethoxysilane, cyclohexylmethyl dimethoxysilane, t-butyl trimethoxysilane, cyclohexyl trimethoxysilane, thexyl trimethoxysilane, tetramethoxysilane and tetraethoxysilane; acetal compounds such as benzophenone dimethoxyacetal, benzophenone diethoxyacetal, acetophenone dimethoxyacetal and acetophenone diethoxyacetal; germanium compounds such as diphenyldimethoxy germanium and phenyltriethoxy germanium; and heterocyclic compounds such as 2,2,6,6-tetramethylpiperidine and 2,2,6,6-tetramethylpyran.

These electron-donating compounds may be used alone or with 2 or more thereof in combination. Preferably, a silicon compound or acetal compound is used, and more preferably a silicon compound having an Si—O—C bond is used.

The polymerization method for the production according to the present invention is not particularly restricted and may be a known one, including liquid phase polymerization such as slurry polymerization or bulk polymerization, and vapor phase polymerization. In addition, batch polymerization, as well as method employing continuous polymerization and batch polymerization may be applied. The polymerization solvent to be used for slurry polymerization is a saturated aliphatic or aromatic hydrocarbon such as hexane, heptane, cyclohexane, toluene, etc., either alone or as a mixture. The polymerization method in the production according to the present invention may also be used for multi-stage polymerization in 2 or more polymerization reactors.

The polymerization temperature is about −50° C. to 200° C., and preferably 20 to 150° C., and the polymerization pressure is from atmospheric pressure to 100 kg/cm$^2$ G, and preferably 3–50 kg/cm$^2$ G. Also, the molecular weight may be controlled by the addition of an appropriate amount of hydrogen during the polymerization.

In addition to homopolymerization of propylene in the production according to the present invention, propylene may be copolymerized with an α-olefin represented by the general formula R—CH=CH$_2$ (where R is hydrogen or a hydrocarbon residue of 1–20 carbon atoms, which may be branched). Specific examples thereof include ethylene, 1-butene, 3-methyl-1-butene, 3-methyl-1-pentene, 4-methyl-1-pentene, 4,4-dimethyl-1-pentene, vinyl cyclopentane, vinyl cyclohexane, etc. Further examples include styrene and styrene derivatives such as α-methylstyrene, dienes such as butadiene, 1,5-hexadiene, 1,7-octadiene, 1,9-decadiene, etc. and allyltrialkylsilanes. These monomers need not be used alone, as two or more thereof may be used in admixture.

Of the propylene-based polymers according to the present invention, propylene-ethylene block copolymers may be produced by multi-stage polymerization in 2 or more polymerization reactors, and here it is particularly preferable to produce homopolypropylene in the first stage.

In this case, if the homopolypropylene procured after completion of the first stage polymerization is made to meet the structural conditions for the present invention, then the finally obtained copolymer will overcome the problems aimed for by the present invention and will have the resulting properties.

In addition, the propylene-based polymer obtained according to the present invention may be made into a resin composition with further improved crystallinity and high-speed moldability by the addition of a publicly known nucleating agent.

Examples of nucleating agents include fillers such as I$_a$ and II$_a$ group metal salts of monocarboxylic acids (for example, sodium benzoate), III–IV group metal salts of dicarboxylic acids (adipic acid) and aliphatic dicarboxylic acids (for example, aluminum p-t-butylbenzoate), dibenzylidene sorbitol derivatives, talc and the like.

Particularly preferred are 1,3,2,4-dibenzylidene sorbitol, 1,3,2,4-di-(p-methylbenzylidene) sorbitol, 1,3,2,4-di-(p-ethylbenzylidene) sorbitol, 1,3,2,4-di-(p-chlorbenzylidene) sorbitol, 1,3-p-chlorbenzylidene-2,4,-p-methylbenzylidene sorbitol, sodium-bis-(4-t-butylphenyl) phosphate, sodium-2,2-methylene-bis-(4,4-di-t-butylphenyl) phosphate, sodium-2-2'-ethylidene-bis-(4,6-di-t-butylphenyl) phosphate, etc, and inorganic fillers such as talk, calcium carbonate.

The effect of the present invention will be quite satisfactory if the amount of the nucleating agent used is in a proportion in the range of at least 0.05–15 wt % in the propylene-based polymer.

It is preferably added in an amount of 0.08–0.8 wt %, and more preferably 0.1–0.5 wt %. However, since inorganic compounds such as talc have less of a nucleating effect than the nucleating agents listed above, they should be added in an amount of 1–15 wt %, preferably 2–13 wt %, and more preferably 5–10 wt %.

Other additives (for example, antioxidants, weatherability stabilizers, antistatic agents, lubricating agents, blocking inhibitors, anti-clouding agents, dyes, pigments, oils, waxes, etc.) commonly used for thermoplastic resins may be appropriately combined with the propylene-based polymer or resin composition according to the present invention, so long as the object of the present invention is not impeded.

Examples of such additives include antioxidants such as 2,5-di-t-butylhydroxyquinone), 2,6-di-t-butyl-p-cresol, 4,4-thiobis-(6-t-butylphenol), 2,2-methylene-bis(4-methyl-6-t-butylphenol), octadecyl-3-(3',5'-di-t-butyl-1'-hydroxyphenyl) propionate and 4,4,-thiobis(6-butylphenol);

ultraviolet absorbers such as ethyl-2-cyano-3,3-diphenylacrylate, 2-(2-hydroxy-5-methylphenyl) benzotriazole and 2-hydroxy-4-octoxybenzophenone; plasticizers such as dimethyl phthalate, diethyl phthalate, wax, liquid paraffin and phosphate esters; antistatic agents such as monostearate, sorbitan monopalmitate, sulfated oleic acid, polyethylene oxide and carbon wax; lubricating agents such as ethylene bis-stearomide, butyl stearate, etc.; coloring agents such as carbon black, phthalocyanine, quinacridone, indoline, azo-based pigments, titanium oxide, iron oxide red, etc., and fillers such as glass fiber, asbestos, mica, pallastonite, calcium silicate, aluminum silicate, etc. In addition, many other high molecular compounds may be blended in therewith so long as the effect of the present invention is not impaired.

The melt index (MFR-JIS-7210, Table 1, condition 14) of the propylene-based polymer according to the present invention is not particularly restricted and may be selected depending on the molding method and the intended use, but a suitable range is usually 0.1–500 g/10 minutes.

The propylene-based polymer according to the present invention may be molded into an injection molded body, form, sheet, tube, bottle or the like using a publicly known fusion molding method or compression molding method, and it may be used alone or laminated with other materials.

For example, such methods of lamination include so-called dry laminate molding and sandwich lamination, wherein a polyurethane, polyester or other based of dry laminate adhesive is used to laminate another thermoplastic resin layer onto the monolayer of the propylene-based polymer or resin composition according to the present invention, or alternatively, a co-extrusion lamination method, co-extrusion method (feed-block method, multi-manifold system), co-injection molding method or co-extrusion pipe molding method may be employed.

The multi-layered laminated body obtained in this manner may then be employed in a method which subjects it to a reheating and drawing process using a vacuum molding machine, compression molding machine or drawing blow machine, etc. or the multi-layered laminated body or mono-layered molding may be subjected to a thermal drawing process using a single-screw or twin-screw drawing machine.

Figure 1:
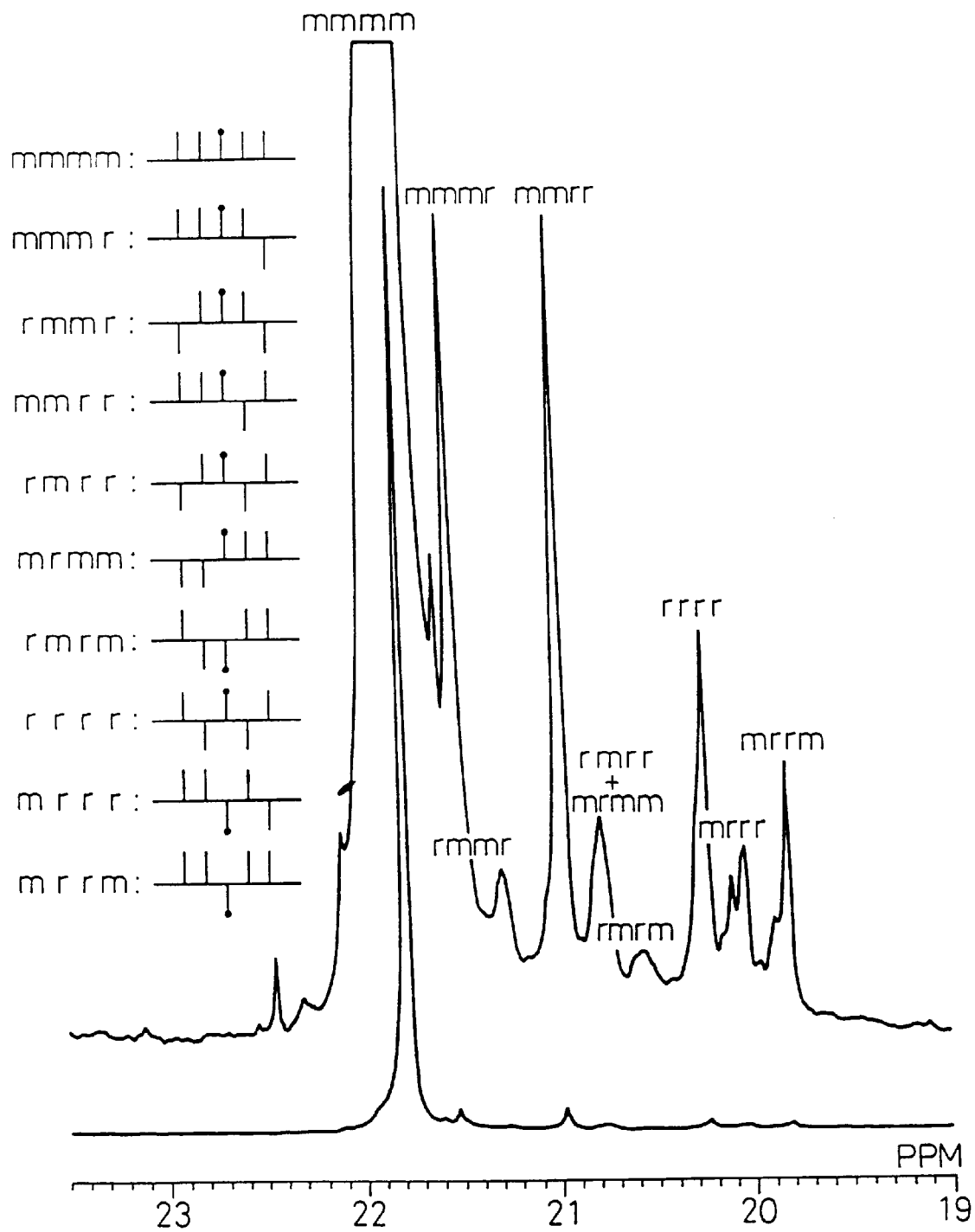
FIG. 1 is an example of a $^{13}$C-NMR spectral chart of the methyl regions of homopolypropylene.

A more detailed description of the present invention will now be provided with reference to the Examples.

EXAMPLES

The methods and equipment used to measure each of the physical property values according to the present invention are indicated below.

(1) Xylene insoluble portion (XI)

A 2.5 g portion of the polymer was dissolved in ortho-xylene (250 ml) at 135° C., and the amount of the polymer (wt %) which precipitated at 25° C. was determined as the xylene insoluble portion (XI).

(2) Isotactic pentad ratio (mmmm)

The mmmm ratio is the isotactic ratio of pentad units of methyl groups in the molecular chain of the propylene-based polymer. The measurement was performed using a JNM-GSX400 ($^{13}$C nuclear resonance frequency of 100 MHz), product of Nihon Denshi, KK. Each of the signals was classified according to A. Zambelli et al., Macromolecules, 13, 267, 1980. The measuring conditions were as follows.

| Measurement mode: | Proton decoupling method |
|---|---|
| Pulse width: | 8.0 μs |
| Pulse repetition time: | 3.0 μs |
| Integration frequency: | 20,000 times |
| Solvent: | Mixed solvent of 1,2,4-trichlorobenzene/deuterated benzene (75/25 vol %) |
| Internal standard: | Hexamethyldisiloxane |
| Sample concentration: | 300 mg/3.0 ml solvent |
| Measuring temperature: | 120° C. |

(3) Isotactic average chain length (N)

The isotactic average chain length (N) is calculated based on the method reported by J. C. Randall (Polymer Sequence Distribution, Academic Press, New York 1977, chapter 2). Specifically, polypropylene is heated at 130° C. to dissolution in a mixed solvent of 1,2,4-trichlorobenzene/deuterated benzene, to a polymer concentration of 10 wt %.

This solution is placed in a glass sample tube having an inside diameter of 10 mmφ, and measured by $^{13}$C-NMR under the same measuring conditions as above for the isotactic pentad ratio (IP). Next, as explained previously, the average chain length (N) may be calculated from the number of meso chains and the number meso units according to the following definition.

N=number of meso chains/number of meso units (4) Column separation

The xylene-insoluble portion of the propylene-based polymer is dissolved in para-xylene at a temperature of 130° C., celite is added thereto, and the temperature is lowered to 30° C. at a temperature-lowering rate of 10° C./hour to deposit the celite. The accretion is filled into a column, the temperature is raised from 70° C. to 130° C. by 2.5° C. at a time, and the fractions are separated off.

(5) Injection molding

A Toshiba Kikai, KK. IS-170FII (theoretical injection volume 250 cm$^3$) was used to prepare an Izod impact test specimen, a flexural modulus test specimen, a heat distortion temperature test specimen and a surface gloss test specimen (flat pieces 15 cm×11 cm of thickness 2 mm). These were then allowed to stand for two full days in a constant temperature room at 50% humidity and 23° C., after which the physical properties thereof were measured.

(6) Izod impact strength (notching)

The measurement was performed according to JIS K7110. The device used was a U-F impact tester, product of Uejima Seisakusho, KK.

(7) Flexural modulus

The measurement was performed according to JIS K7203.

(8) Ethylene content

The calculation was made based on the $^{13}$C-NMR method reported by C. J. Carman et al. (Macromolecules, 10, 537, 1977).

(9) MFR (Melt Flow Rate)

The measurement was made according to JIS K7210, Table 1, condition 14. The device used was a melt indexer, product of Takara, KK.

(10) Heat distortion temperature

The measurement was made according to the JIS K7207B method, using an HDTεVSPT tester, product of Toyo Seiki Seisakusho, KK.

(11) Rockwell surface hardness

The samples to be measured were prepared with a press molding machine at a temperature of 230° C., and the measurement was made using a Rockwell hardness meter, model AR-10, product of Toyo Seiki Seisakusho, KK., according to JIS K7202.

(12) Film molding

A 40 mmφ T-die film molding machine, product of Yoshii Tekko, KK. was used to prepare a film of thickness 60 μm, under conditions of a die temperature of 230° C., a cooling temperature of 30° C. and a drawing rate of 10 m/min, and the vapor permeability, haze and surface gloss were measured.

(13) Haze

The measurement was performed according to JIS K7105, using a Haze meter, model HGM-2D, product of Suga Shikenki, KK.

(14) Surface gloss

The measurement was performed according to JIS K7105, using a gloss meter, model VG-1D, product of Nihon Denshoku Kogyo, KK.

(15) Water Vapor permeability

The measurement was made according to ASTM-E96, using a PERMATRAN W, product of Modern Controls, Inc., under conditions of a temperature of 37.8° C. and 90% relative humidity.

(16) Catalyst analysis

The unmodified solid catalyst components and the modified solid catalyst components for olefin polymerization were dissolved in dilute sulfuric acid, and the organic portion was extracted with heptane. The Ti in the aqueous layer was determined using an atomic absorption spectrophotometer, model AA610S, product of Shimazu Seisakusho, KK. The electron-donating compound in the heptane layer was determined using a gas chromatograph 263-50, product of Hitachi Seisakusho, KK.

Example 1

(1) Preparation of unmodified solid catalyst component (common method)

A 56.8 g (597 mmol) portion of anhydrous magnesium dichloride was completely dissolved in 100 g (174 mmol) of absolute ethanol, 500 ml of CP15N vaseline oil, product of Idemizu Kosan, KK. and 500 ml of KF96 silicone oil, product of Shinetsu Silicone, KK. in a nitrogen atmosphere at 120° C. The mixture was agitated for 3 minutes using a TK homomixer, product of Tokushu-Kika Kogyo, KK., at 3000 rpm. It was then transferred to 2 liters of anhydrous heptane while agitation was maintained, without allowing the temperature to exceed 0° C. The resulting white solid was washed with a sufficient amount of anhydrous heptane and the substance was vacuum dried at room temperature.

A 30 g portion of the resulting globular solid $MgCl_2 \cdot 2.5C_2H_5OH$ was suspended in 200 ml of anhydrous heptane. While stirring at 0° C., 500 ml (4.5 mol) of titanium tetrachloride was added dropwise thereto over a period of one hour. Heating was then initiated, and when the temperature reached 40° C., 4.96 g (17.8 mmol) of diisobutyl phthalate was added thereto and the temperature was raised to 100° C. over a period of about an hour. After conducting the reaction at 100° C. for 2 hours, the solid portion was collected by filtration while still hot. Then, 500 ml (4.5 mol) of titanium tetrachloride was suspended in the reaction product and allowed to react therewith at 120° C. for one hour. After completion of the reaction, the solid portion was again collected by filtration while still hot, and washed 7 times with 1.0 liter of hexane at 60° C. and 3 times with 1.0 liter of hexane at room temperature. The titanium content of the resulting solid catalyst component was measured and found to be 2.25 wt %. The component also contained 7.81 wt % of an electron-donating compound (1).

(2) Preparation of modified solid catalyst component

A 20 g portion of the unmodified solid catalyst component obtained above was suspended in 300 ml of toluene, and was allowed to react for one hour with 2.78 g (10 mmol) of diisobutyl phthalate at 25° C. After completion of the reaction, 100 ml (900 mmol) of titanium tetrachloride was added thereto for reaction at 90° C. for one hour. After completion of the reaction the solid portion was collected by filtration while still hot, and then 300 ml of toluene and 100 ml (900 mmol) of titanium tetrachloride were suspended in the reaction product and allowed to react therewith at 90° C. for one hour. After completion of the reaction, the solid portion was again collected by filtration while still hot, and washed 7 times with 500 ml of toluene at 90° C. and 3 times with 500 ml of hexane at room temperature. The titanium content of the resulting solid catalyst component was measured and found to be 1.01 wt %. The component also contained 12.0 wt % of a first electron-donating compound. A comparison of the results of analysis of the catalyst components before and after their modification is provided in Table 1.

(3) Prepolymerization

Into a 3-liter autoclave were charged in a nitrogen atmosphere 500 ml of n-heptane, 6.0 g (53 mmol) of triethylaluminum, 3.9 g (17 mmol) of dicyclopentyl dimethoxysilane and 10 g of the modified olefin polymerization catalyst component obtained in (2) above, and the mixture was stirred for 5 minutes at a temperature of about 0–5° C. Propylene was then fed to the autoclave for polymerization of 10 g of propylene per one gram of the modified olefin polymerization catalyst component, for prepolymerization for one hour at a temperature of about 0–5° C. The resulting prepolymerization solid catalyst component was washed 3 times with 500 ml of n-heptane, and was used for the following production of a propylene-based polymer.

(4) Main polymerization

In a 60-liter stirrer-equipped autoclave were placed, in a nitrogen atmosphere, 2.0 g of the prepolymerization solid catalyst component prepared by the method described above, 11.4 g (100 mmol) of triethylaluminum and 6.84 g (30 mmol) of dicyclopentyl dimethoxysilane, and then 18 kg of propylene and hydrogen at 13,000 mol ppm with respect to the propylene were fed thereto and the temperature was raised to 70° C. for polymerization for one hour. After one hour the unreacted propylene was removed to terminate polymerization. The result was 6.56 kg of polypropylene, or a polymerization activity of 32.8 kg per gram of the solid catalyst component, and the MFR of the polymer was 33.0 g/10 minutes. The results of evaluation of the physical properties of the polymer are given in Table 2.

Example 2

(1) Preparation of unmodified solid catalyst component Conducted in the same manner as in Example 1.

(2) Preparation of $TiCl_4 [C_6H_4(COO^i C_4H_9)_2]$

To a 1.0 liter solution of hexane containing 19 g (100 mmol) of titanium tetrachloride was added dropwise 27.8 g (100 mmol) of diisobutyl phthalate:$C_6H_4(COO^iC_4H_9)_2$, over a period of about 30 minutes while maintaining a temperature of 0° C. After the dropwise addition, the temperature was raised to 40° C. for reaction for 30 minutes. After completion of the reaction, the solid portion was collected and washed 3 times with 500 ml of hexane to obtain the object substance.

(3) Preparation of modified olefin polymerization catalyst component

A 20 g portion of the solid catalyst component obtained in (1) above was suspended in 300 ml of toluene, and treated for 1 hour with 5.2 g (11 mmol) of TiCl$_4$ [C$_6$H$_4$(COO$^i$C$_4$H$_9$)$_2$] at 25° C. for incorporation. After completion of the incorporation, the solid portion was collected by filtration while still hot and was resuspended in 10 ml (90 mmol) of titanium tetrachloride, stirred for one hour at 90° C. for washing, and the solid portion collected by filtration while still hot, after which the reaction product was washed 5 times with 500 ml of toluene at 90° C. and 3 times with 500 ml of hexane at room temperature. The titanium content of the resulting solid catalyst component was measured and found to be 0.91 wt %. The component also contained 10.6 wt % of a first electron-donating compound. A comparison of the results of analysis of the catalysts before and after their modification is provided in Table 1.

(4) Prepolymerization

Into a 3-liter autoclave were charged in a nitrogen atmosphere 500 ml of n-heptane, 6.0 g (53 mmol) of triethylaluminum, 3.9 g (17 mmol) of dicyclopentyl dimethoxysilane and 10 g of the modified olefin polymerization catalyst component obtained in (3) above, and the mixture was stirred for 5 minutes at a temperature of about 0–5° C. Propylene was then fed to the autoclave for polymerization of 10 g of propylene for 1 g of the modified olefin polymerization catalyst component, for prepolymerization for one hour at a temperature of about 0–5° C. The resulting prepolymerization solid catalyst component was washed 3 times with 500 ml of n-heptane, and was used for the following production of a propylene-based polymer.

(5) Main polymerization

In a 60-liter stirrer-equipped autoclave were placed, in a nitrogen atmosphere, 2.0 g of the prepolymerization solid catalyst component prepared by the method described above, 11.4 g (100 mmol) of triethylaluminum and 6.84 g (30 mmol) of dicyclopentyl dimethoxysilane, and then 18 kg of propylene and hydrogen at 13,000 mol ppm with respect to the propylene were fed thereto and the temperature was raised to 70° C. for polymerization for one hour. After one hour the unreacted propylene was removed to terminate polymerization. The result was 6.64 kg of polypropylene, or a polymerization activity of 34 kg per gram of the solid catalyst component, and the MFR of the polymer was 34.2 g/10 minutes. The results of evaluation of the physical properties of the polymer are given in Table 2.

Comparison I

In a 60-liter stirrer-equipped autoclave were placed, in a nitrogen atmosphere, 6.0 g of AA-type titanium trichloride, product of Toso Akuzo, KK. and 23.5 g (195 mmol) of diethylaluminum chloride, and then 18 kg of propylene and hydrogen at 8000 mol ppm with respect to the propylene were fed thereto and the temperature was raised to 70° C. for polymerization for one hour. After one hour the unreacted propylene was removed to terminate polymerization. The result was 6.23 kg of polypropylene, with an MFR of the polymer of 32.2 g/10 minutes. The results of evaluation of the physical properties of the polymer are given in Table 2.

Comparison 2

The prepolymerization and polymerization were conducted with the same methods and conditions as in Example 2, except that the unmodified solid catalyst component prepared in Example 1 (1) was used for the polymerization, and the hydrogen was charged at 9300 mol ppm. The result was 6.88 kg of polypropylene, with an MFR of the polymer of 33.0 g/10 minutes. The results of evaluation of the physical properties of the polymer are given in Table 2.

Examples 3–5

Polypropylene was produced with the same methods and conditions as in Example 2, except that the charging of hydrogen was controlled during production of the propylene-based polymers so that the MFRs of the resulting polypropylene products were, respectively, 10.5 g/10 minutes, 2.7 g/10 minutes and 0.7 g/10 minutes. The results of evaluation of the physical properties of the resulting polymers are given in Table 2.

Comparison 3

A propylene-based polymer was produced with the same methods and conditions as in Comparison 1, except that the charging of hydrogen was controlled during production of the propylene-based polymer so that the MFR of the resulting polymer was 3.2 g/10 minutes. The results of evaluation of the physical properties of the resulting polymer are given in Table 2.

Example 6

(1) Preparation of unmodified solid catalyst component

In a nitrogen atmosphere, 47.6 g (500 mmol) of anhydrous magnesium dichloride, 250 ml of decane and 234 ml (1.5 mol) of 2-ethylhexyl alcohol were heated together at 130° C. for 2 hours for reaction to make a uniform solution, after which 11.1 g (75 mmol) of phthalic anhydride was added to the solution which was further stirred at 130° C. for one hour to dissolve the phthalic anhydride in the uniform solution. After the resulting uniform solution was cooled to room temperature, the entire amount thereof was added dropwise over a period of an hour to 2.0 liters (18 mol) of titanium tetrachloride which had been kept at −20° C. After the dropwise addition was completed, the temperature of the mixed solution was raised to 110° C. over a period of 4 hours, and when it reached 110° C., 26.8 ml (125 mmol) of diisobutyl phthalate was added thereto and the mixture was stirred for 2 hours at 110° C. for reaction. After completion of the reaction, the solid portion was collected by filtration while still hot, and then 2.0 liters (18 mol) of titanium tetrachloride was suspended in the reaction product and allowed to react therewith at 110° C. for 2 hours. After completion of the reaction, the solid portion was again collected by filtration while still hot, and washed 7 times with 2.0 liters of decane at 110° C. and 3 times with 2.0 liters of hexane at room temperature, to obtain a solid catalyst component. The results of analysis of the catalyst are given in Table 1.

(2) Preparation of TiCl$_4$ [C$_6$H$_4$(COO$^i$ C$_4$H$_9$)$_2$]

This was conducted as in (2) of Example 2.

(3) Preparation of modified olefin polymerization catalyst component

A 40 g portion of the solid catalyst component obtained in (1) above was suspended in 600 ml of toluene, and treated for one hour with 10.3 g (22 mmol) of $TiCl_4$ $[C_6H_4(COO^i C_4H_9)_2]$ obtained in (2) above at 90° C. for incorporation. After completion of the incorporation, the solid portion was collected by filtration while still hot and was resuspended in 600 ml of toluene and 20 ml (180 mmol) of titanium tetrachloride, stirred for one hour at 90° C. for washing, and the solid portion collected by filtration while still hot, after which the reaction product was washed 5 times with one liter of toluene at 90° C. and 3 times with 1 liter of hexane at room temperature, to obtain a modified olefin polymerization catalyst component. The results of analysis of the catalyst are given in Table 1.

(4) Prepolymerization

Into a 3-liter autoclave were charged in a nitrogen atmosphere 500 ml of n-heptane, 6.0 g (0.053 mol) of triethylaluminum, 4.15 g (0.017 mmol) of diphenyl dimethoxysilane and 10 g of the improved olefin polymerization catalyst component obtained in Example 2 (3) above, and the mixture was stirred for 5 minutes at a temperature of about 0–5° C. Propylene was then fed to the autoclave for polymerization of 10 g of propylene per one gram of the modified olefin polymerization catalyst component, for prepolymerization for one hour at a temperature of about 0–5° C. The resulting prepolymerization solid catalyst component was washed 3 times with 500 ml of n-heptane, and was used for the following production of a propylene-based polymer.

(5) Main propylene polymerization

In a 60-liter stirrer-equipped autoclave were placed, in a nitrogen atmosphere, 2.0 g of the prepolymerization solid catalyst component prepared by the method described above, 11.4 g (100 mmol) of triethylaluminum and 7.32 g (30 mmol) of diphenyl dimethoxysilane, and then 18 kg of propylene and hydrogen at 5300 mol ppm with respect to the propylene were fed thereto and the temperature was raised to 70° C. for polymerization for one hour. After one hour the unreacted propylene was removed to terminate polymerization. The polymerization activity was 22.0 kg per gram of the solid catalyst component. Also, the MFR of the resulting polypropylene was 14.5 g/10 minutes. The results of evaluation of the physical properties of the polymer are given in Table 2.

Example 7

(1) Preparation of unmodified solid catalyst component

A 50.0 g (440 mmol) portion of diethoxy magnesium and 15.3 g (55 mmol) of di-n-butyl phthalate were refluxed and stirred in 250 ml of methylene chloride for one hour in a nitrogen atmosphere. The resulting suspension was pressure-fed to 2.0 liters (18 mol) of titanium tetrachloride, and the temperature was raised to 110° C. for reaction for 2 hours. After completion of the reaction, the precipitated solid was reacted with 2.0 liters (18 mol) of titanium tetrachloride at 110° C. for 2 hours. After completion of this reaction, the product was washed 3 times with 2.0 liters of n-decane at 110° C. and then with 2.0 liters of n-hexane at room temperature, until chloride ion was no longer detected. It was then dried under reduced pressure at 40° C. to obtain the object solid catalyst component. The results of analysis of the catalyst are given in Table 1.

(2) Preparation of $TiCl_4$ $[C_6H_4(COO^i C_4H_9)_2]$

This was conducted as in (2) of Example 2.

(3) Preparation of modified olefin polymerization catalyst component

A 40 g portion of the solid catalyst component obtained in (1) above was suspended in 600 ml of toluene, and treated for one hour with 10.3 g (22 mmol) of $TiCl_4$ $[C_6H_4(COO^i C_4H_9)_2]$ obtained in (2) above at 90° C. for incorporation. After completion of the incorporation, the solid portion was collected by filtration while still hot and was resuspended in 600 ml of toluene and 20 ml (180 mmol) of titanium tetrachloride, stirred for one hour at 90° C. for washing, and the solid portion collected by filtration while still hot, after which the reaction product was washed 5 times with one liter of toluene at 90° C. and 3 times with 1 liter of hexane at room temperature. The results of analysis of the catalyst are given in Table 1.

The prepolymerization and the propylene polymerization were conducted with the same methods and conditions as in Example 6. The result was a polymerization activity of 21.1 kg per gram of the solid catalyst component. Also, the MFR of the resulting polypropylene was 16.3 g/10 minutes. The results of evaluation of the physical properties of the polymer are given in Table 2.

TABLE 1

Results of catalyst analysis

| | Unmodified solid catalyst component | | | Modified olefin polymerization catalyst component | | | |
|---|---|---|---|---|---|---|---|
| | $D_i$ (wt %) | Ti (wt %) | (D/T)$_i$ | $D_m$ (wt %) | Ti (wt %) | (D/T)$_m$ | (D/T)$_m$/(D/T)$_i$ |
| Example 1 | 7.81 | 2.25 | 0.60 | 12.0 | 1.01 | 2.05 | 3.42 |
| Example 2 | 7.81 | 2.25 | 0.60 | 10.6 | 0.91 | 2.01 | 3.35 |
| Example 6 | 10.1 | 2.57 | 0.75 | 15.6 | 1.01 | 1.98 | 2.64 |
| Example 7 | 9.80 | 2.31 | 0.73 | 13.3 | 1.22 | 1.53 | 2.10 |

TABLE 2-1

| Example or Comparison | Xylene extraction insoluble portion (XI) (wt %) | Isotactic pentad ratio (IP) mmmm (%) | Isotactic average chain length (N) | Weight proportion of fractions ($N_f$) with isotactic average chain length N > 800 (wt %) | MFR (g/10 min) |
|---|---|---|---|---|---|
| Example 1 | 99.5 | 99.5 | 816 | 80 | 33.0 |
| Example 2 | 99.5 | 99.5 | 836 | 81 | 34.2 |
| Comparison 1 | 98.6 | 97.7 | 225 | <1 | 32.2 |
| Comparison 2 | 98.8 | 98.9 | 326 | 7 | 33.0 |
| Example 3 | 99.5 | 99.5 | 715 | 76 | 10.5 |
| Example 4 | 99.5 | 99.4 | 651 | 72 | 2.7 |
| Example 5 | 99.4 | 99.3 | 588 | 65 | 0.7 |
| Example 6 | 99.3 | 99.3 | 703 | 68 | 14.5 |
| Example 7 | 99.3 | 99.4 | 765 | 70 | 16.3 |
| Comparison 3 | 98.1 | 96.3 | 105 | <1 | 3.2 |

TABLE 2-2

| Example or Comparison | Injection molding | | | | | | Film | | |
|---|---|---|---|---|---|---|---|---|---|
| | Izod impact strength (kg.cm/cm) | | Flexural modulus (kg/cm²) | Heat distortion temperature (° C.) | Rockwell surface hardness (R scale) | Degree of surface gloss (%) | Degree of surface gloss (%) | Water vapor permeability (g/cm².day) | Haze (%) |
| | 23° C. | −20° C. | | | | | | | |
| Example 1 | 1.7 | — | 17900 | 130 | 104 | 86.0 | 120 | 5.6 | 2.4 |
| Example 2 | 1.8 | — | 18100 | 131 | 104 | 86.4 | 122 | 5.6 | 2.4 |
| Comparison 1 | 2.0 | — | 14600 | 119 | 93 | 83.2 | 46 | 7.9 | 23.3 |
| Comparison 2 | 1.8 | — | 16200 | 127 | 101 | 84.2 | 116 | 6.1 | 3.2 |
| Example 3 | 2.0 | — | 17900 | 130 | 103 | 85.1 | 117 | 5.5 | 2.8 |
| Example 4 | 2.8 | — | 17200 | 130 | 102 | 84.3 | 113 | 5.4 | 3.0 |
| Example 5 | 4.4 | — | 14200 | 110 | 96 | 83.9 | — | — | — |
| Example 6 | 2.0 | — | 17300 | 128 | 101 | 85.2 | — | — | — |
| Example 7 | 2.0 | — | 17500 | 128 | 101 | 85.3 | — | — | — |
| Comparison 3 | 2.5 | — | 12300 | 104 | 88 | 81.6 | 42 | 7.7 | 20.9 |

Example 8

After propylene was polymerized (1st stage) in a 60-liter stirrer-equipped autoclave in the same manner as in Example 2, the liquid propylene was removed and a mixed gas of ethylene/propylene=40/60 (molar ratio) was fed at a rate of 2.2 Nm³/hour and hydrogen at a rate of 20 NL/hour, at 75° C., for copolymerization for 40 minutes (2nd stage). After 40 minutes the unreacted gas was removed to suspend the polymerization. As a result 8.0 kg of a propylene/ethylene block copolymer was obtained. The ethylene content as determined by $^{13}$C-NMR was 9.7 wt %, and the MFR was 17.8 g/10 minutes. The results of evaluation of the physical properties of the polymer are given in Table 3. In the table, XI, IP and N shown are for the homopolypropylene obtained after completion of the 1st stage polymerization.

Comparison 4

After propylene was polymerized in a 60-liter stirrer-equipped autoclave in the same manner as in Comparison 1, the liquid propylene was removed and a mixed gas of ethylene/propylene=40/60 (molar ratio) was fed at a rate of 2.2 Nm³/hour and hydrogen at a rate of 20 NL/hour, at 65° C., for copolymerization for 40 minutes. After 40 minutes the unreacted gas was removed to suspend the polymerization. As a result 7.7 kg of a propylene/ethylene block copolymer was obtained. The ethylene content as determined by $^{13}$C-NMR was 9.6 wt %, and the MFR was 18.3 g/10 minutes. The results of evaluation of the physical properties of the polymer are given in Table 3. In the table, XI, IP and N shown are for the homopolypropylene obtained after completion of the 1st stage polymerization.

TABLE 3-1

| Example or Comparison | Xylene extraction insoluble portion (XI) (wt %) | Isotactic pentad ratio (IP) mmmm (%) | Isotactic average chain length (N) | Weight proportion of fractions ($N_f$) with isotactic average chain length N > 800 (wt %) | MFR (g/10 min) |
|---|---|---|---|---|---|
| Example 8 | 99.5 | 99.5 | 830 | 79 | 17.8 |
| Comparison 4 | 98.5 | 97.7 | 217 | <1 | 18.3 |

TABLE 3-2

| Example or Comparison | Injection molding | | | | | | Film | | |
|---|---|---|---|---|---|---|---|---|---|
| | Izod impact strength (kg.cm/cm) | | Flexural modulus (kg/cm²) | Heat distortion temperature (° C.) | Rockwell surface hardness (R scale) | Degree of surface gloss (%) | Degree of surface gloss (%) | Water vapor permeability (g/cm².day) | Haze (%) |
| | 23° C. | −20° C. | | | | | | | |
| Example 8 | 6.4 | 3.9 | 14100 | 124 | 92 | 68.1 | — | — | — |
| Comparison 4 | 5.5 | 3.3 | 12100 | 112 | 87 | 62.3 | — | — | — |

Examples 9, 10 and Comparison 5

As a propylene-based polymer composition there were combined with a propylene-based polymer obtained according to the present invention 0.05 wt % of di-t-butyl-p-cresol, 0.10 wt % of pentaerythrityl-tetrakis [3-(3,5-dibutyl-4-hydroxyphenyl)] propionate and 0.10 wt % of calcium stearate, using for the mixing a 20-liter supermixer (model SMV20), product of Kawata Seisakusho Co., and a 30 mmφ twin-screw extruder, product of Nakatani Kikai Co. was used to make pellets. The following compounds were used as nucleating agents, and the amounts were appropriately varied.

(Types of nucleating agents)

Nucleating agent A: Aluminum p-t-butylbenzoate
Nucleating agent B: Sodium 2,2-methylenebis (4,6-di-tert-butylphenyl) phosphate Table 4 lists the results of evaluation of the physical properties of the compositions (Examples 9,10) prepared by combining the above mentioned nucleating agents with the polypropylene obtained in Example 2 and the composition (Comparison 5) prepared by combining a nucleating agent with the polypropylene obtained in Comparison 1.

Example 11 and Comparison 6

Table 4 also lists the results of evaluation of the physical properties of the compositions obtained by combining a nucleating agent with the propylene/ethylene block copolymers obtained in Example 8 and Comparison 4, in the same manner as in Example 9.

packaging, whose physical properties including rigidity, surface hardness, heat resistance, water vapor barrier property, etc. are more excellent than those of the prior art, the present invention has considerable industrial value.

We claim:

1. A method for producing a solid catalyst component for propylene polymerization, which comprises the steps of:
   1) forming a solid catalyst component for polymerization comprising a magnesium compound, a titanium compound, a halogen compound and an electron-donating compound, wherein the molar ratio of the electron-donating compound (D) and the titanium content (T) incorporated therein is $(D/T)_i$, and
   2) treating said solid catalyst component for polymerization to make a modified solid catalyst component for polymerization, said treating comprising:
      i) treating said solid catalyst component with an electron-donating compound for its incorporation or with a titanium compound represented by the general formula $TiX_a \cdot Y_b$, where X is a halogen atom: a is 3 or 4: Y is an electron-donating compound, and $0 < b \leq 3$, for its incorporation;
      ii) then treating and washing said solid catalyst component with a halogenous compound, and
      iii) further washing said solid catalyst component with a hydrocarbon,

TABLE 4-1

| Example or Comparison | Xylene extraction insoluble portion (XI) (wt %) | Isotactic pentad ratio (IP) mmmm (%) | Isotactic average chain length (N) | Weight proportion of fractions ($N_f$) with isotactic average chain length N > 800 (wt %) | MFR (g/10 min) | Type of nucleating agent and content (wt %) |
|---|---|---|---|---|---|---|
| Example 9 | 99.5 | 99.5 | 836 | 81 | 34.2 | A 0.2 |
| Example 10 | 99.5 | 99.5 | 836 | 81 | 34.2 | B 0.4 |
| Comparison 5 | 98.8 | 98.9 | 326 | 7 | 32.2 | B 0.4 |
| Example 11 | 99.5 | 99.5 | 830 | 79 | 17.8 | A 0.2 |
| Comparison 6 | 98.5 | 97.7 | 217 | <1 | 18.3 | A 0.2 |

TABLE 2-2

| | Injection molding | | | | | Film | | |
|---|---|---|---|---|---|---|---|---|
| | Izod impact strength (kg.cm/cm) | | Flexural modulus (kg/cm²) | Heat distortion temperature (°C.) | Rockwell surface hardness (R scale) | Degree of surface gloss (%) | Degree of surface gloss (%) | Water vapor permeability (g/cm².day) | Haze (%) |
| Example or Comparison | 23° C. | −20° C. | | | | | | | |
| Example 9 | 1.7 | — | 22000 | 141 | 105 | 91.7 | 81 | 5.3 | 13.5 |
| Example 10 | 1.9 | — | 24500 | 148 | 109 | 93.8 | 84 | 5.1 | 11.6 |
| Comparison 5 | 1.7 | — | 19200 | 131 | 102 | 86.3 | 32 | 7.2 | 28.9 |
| Example 11 | 6.2 | 3.8 | 16800 | 134 | 99 | 72.2 | — | — | — |
| Comparison 6 | 5.3 | 3.0 | 14600 | 124 | 91 | 67.2 | — | — | — |

Industrial Applicability

Since according to the present invention it is possible to produce propylene-based polymers and compositions suitable for automobiles, consumer electric goods and wherein the molar ratio of the electron-donating compound (D) and the titanium content (T) incorporated in said solid catalyst component thus treated is $(D/T)_m$, such that $(D/T)_m/(D/T)_i > 1$.

2. A method according to claim 1, wherein $(D/T)_m/(D/T)_i \geqq 2$.

3. A method according to claim 1, wherein said step (2) of treating the solid catalyst component comprises the steps of:

treating said solid catalyst component with an electron-donating compound for its incorporation;

then treating and washing said solid catalyst component with a halogenous compound, and further washing said solid catalyst component with a hydrocarbon.

4. A method according to claim 1, wherein said step (2) of treating the solid catalyst component comprises the steps of:

treating said solid catalyst component with a titanium compound represented by the general formula $TiX_a \cdot Y_b$, where X is a halogen atom; a is 3 or 4; Y is an electron-donating compound; and $0 < b \leqq 3$, for its incorporation;

then treating and washing said solid catalyst component with a halogenous compound, and further washing said solid catalyst component with a hydrocarbon.

* * * * *